United States Patent
Liu et al.

(10) Patent No.: US 9,357,167 B2
(45) Date of Patent: May 31, 2016

(54) PARTICIPATING IN A PEER-TO-PEER COMMUNICATION SESSION

(71) Applicant: International Business Machines Corporation, Armonk, NY (US)

(72) Inventors: Jeffrey C H Liu, Taipei (TW); Xavier A. Vasques, Saint Andre de Sangonis (FR)

(73) Assignee: International Business Machines Corporation, Armonk, NY (US)

(*) Notice: Subject to any disclaimer, the term of this patent is extended or adjusted under 35 U.S.C. 154(b) by 134 days.

(21) Appl. No.: 14/340,121

(22) Filed: Jul. 24, 2014

(65) Prior Publication Data
US 2015/0092010 A1 Apr. 2, 2015

(30) Foreign Application Priority Data
Sep. 30, 2013 (TW) .............................. 102135421 A (51) Int. Cl.
H04L 29/08 (2006.01)
H04L 29/06 (2006.01)
H04N 7/15 (2006.01)

(52) U.S. Cl.
CPC .................. *H04N 7/15* (2013.01); *H04L 63/08* (2013.01); *H04L 65/1083* (2013.01); *H04L 65/605* (2013.01); *H04L 67/1076* (2013.01); *H04L 67/1093* (2013.01)

(58) Field of Classification Search
None
See application file for complete search history.

(56) References Cited

U.S. PATENT DOCUMENTS

| 8,239,547 | B2 | 8/2012 | Synnergren et al. | |
| 2009/0089379 | A1* | 4/2009 | Pegg | G06F 9/54 709/206 |
| 2009/0158394 | A1* | 6/2009 | Oh | G06F 21/31 726/3 |
| 2011/0178821 | A1 | 7/2011 | Smith | |
| 2012/0016695 | A1* | 1/2012 | Bernard | G06Q 40/08 705/4 |
| 2012/0212575 | A1 | 8/2012 | Chen et al. | |
| 2012/0278500 | A1 | 11/2012 | Ganjam et al. | |
| 2013/0003537 | A1 | 1/2013 | Khasnabish | |
| 2013/0066974 | A1 | 3/2013 | Yoakum et al. | |
| 2013/0106989 | A1 | 5/2013 | Gage et al. | |
| 2014/0282981 | A1* | 9/2014 | Satpathy | H04L 63/083 726/8 |
| 2014/0289717 | A1* | 9/2014 | Chan | G06F 9/54 717/147 |

FOREIGN PATENT DOCUMENTS

TW 201322167 A1 6/2013
WO 2011143440 11/2011

OTHER PUBLICATIONS

Balasco et al., "Transition to Cloud Video Conferencing," Radisys, White Paper, Dec. 2012, pp. 1-16.
(Continued)

*Primary Examiner* — Simon Sing
*Assistant Examiner* — Jeffrey Lytle
(74) *Attorney, Agent, or Firm* — VanLeeuwen & VanLeeuwen; Damion C. Josephs (57) ABSTRACT

A third party automatically participates in a peer-to-peer communication session established between a first endpoint and a second endpoint. Once the peer-to-peer communication session is established, a third party receives a first user data provided by the first endpoint, and verifies the first user data. If the verification succeeds, the third party automatically participates in the peer-to-peer communication session.

13 Claims, 4 Drawing Sheets

(56) References Cited

OTHER PUBLICATIONS

Acharya et al., "Session Initiation Protocol (SIP): Impact and Implications," International Business Machines Corporation, IBM Global Technology Services Technical White Paper, Jan. 2011, pp. 1-16.
Johansson et al., "Session Mobility in Multimedia Services Enabled by the Cloud and Peer-To-Peer Paradigms," 5th IEEE Workshop on User Mobility and Vehicular Networks, Bonn, Germany, Oct. 2011, pp. 774-780.
Rosenberg, "A Framework for Conferencing with the Session Initiation Protocol (SIP)," Network Working Group, Request for Comments: 4353, The Internet Society, Feb. 2006, 27 pages.
Johnston et al., Session Initiation Protocol (SIP) Call Control—Conferencing for User Agents, Network Working Group, Request for Comments: 4579, The Internet Society, Aug. 2006, 44 pages.

\* cited by examiner

PARTICIPATING IN A PEER-TO-PEER COMMUNICATION SESSION

BACKGROUND OF THE INVENTION

The present invention relates generally to network communication, and more particularly, to peer-to-peer (P2P) communication technology for supporting real-time audio or video communication.

In 2009, Google launched Google Wave which provides multiple applications for supporting multiple-person and real-time joint operation. For example, both "Map Gadget" and "Draw Board for Google Wave" enable multiple persons to edit the same file and work in real time, but their purpose is restricted to individual user's operation and lacks the concept of usernames and application authority.

In US 20110178821, Douglas Smith discloses a system whereby medical professionals share a patient's medical images through a conference call in a manner to allow a physician to request a conference call with the other medical professionals while examining a specific patient's data (such as medical images, including x-ray images and ultrasonographic images). The system downloads the data and sends the downloaded data to the medical professionals' computer apparatuses as soon as the medical professionals accept an invitation to participate in the conference call.

In US 20130066974, John H. Yoakum et al. disclose a method for initiating an application for participants of an audio conference to allow a participant to initiate an application after a conference call has been established and thus allow all the other participants to access the application through their respective apparatuses by sharing their desktop with other participants, wherein the application supports the participants' joint operation.

SUMMARY

An approach is provided which enables a third party platform to be integrated into peer-to-peer communication so as to provide better data protection. In contrast to a client-server network communication framework, peer-to-peer (P2P) network communication incurs relatively low operation costs and supports multiple users simultaneously. At present, peer-to-peer communication services, such as Skype, are in wide use and manifest indisputable advantages. However, during peer-to-peer communication, data is circulated and disseminated directly between endpoints, but in the absence of a centralized server serving to control the circulation and dissemination of data, and thus the resultant convenience is accompanied by the increased risk of confidential data leakage.

Take long-distance medical consultations as an example, at a Web-based conference, such as Skype, a physician performs long-distance diagnosis on a patient when both the physician and patient are equipped with their respective personal communication apparatuses, such as personal computers or mobile phones, whereas the patient accesses the file transfer function of Skype to provide a medical record or the other information to the physician for reference in diagnosis and analysis. However, medical records are important privacy-related data pertaining to patients, and thus countries worldwide exercise strict control over the dissemination of medical records. Therefore, patients could be prohibited from sending medical records through Skype to physicians, especially overseas physicians. Furthermore, medical records that are kept in physicians' personal apparatuses thereby increase the risk of medical record leakage.

In one embodiment, the present invention provides a trusted third party platform to be introduced into real-time peer-to-peer communication. For example, a patient can upload a medical record to the third party platform rather than send the medical record directly to a physician. The third party platform analyzes and processes the medical record indirectly under the physician's control or according to a program tool provided by the physician. Furthermore, the third party platform automatically participates in a video conference and displays through the video conference an analysis result on the physician's and the patient's video conference screens. In doing so, the physician sees only the analysis result but cannot see the patient's medical record fully, thereby reducing the risk of medical record leakage.

Moreover, peer-to-peer communication dispenses with a centralized server, and thus the endpoints cannot access auxiliary resources, such as a database, otherwise available on a centralized server; instead, the endpoints have to resort to their own resources. In general, the endpoints have quite limited computation functionality and storage space. In view of this, the present invention is characterized by a third party platform with sufficient computation functionality and storage space to join an established peer-to-peer communication session and thereby give the endpoints the information and functionality required to undergo peer-to-peer communication, without being subject to the limit of resources of the endpoints.

The present invention provides, in another embodiment thereof, a computer program product stored in a computer-accessible medium. The computer program product includes a computer-readable program executable on a computer system to implement the aforesaid methods.

In another embodiment, the present invention provides a computer system including a memory and a processor. The memory stores therein a computer executable command. The processor accesses the memory to execute the computer executable command for performing the aforesaid method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 4, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
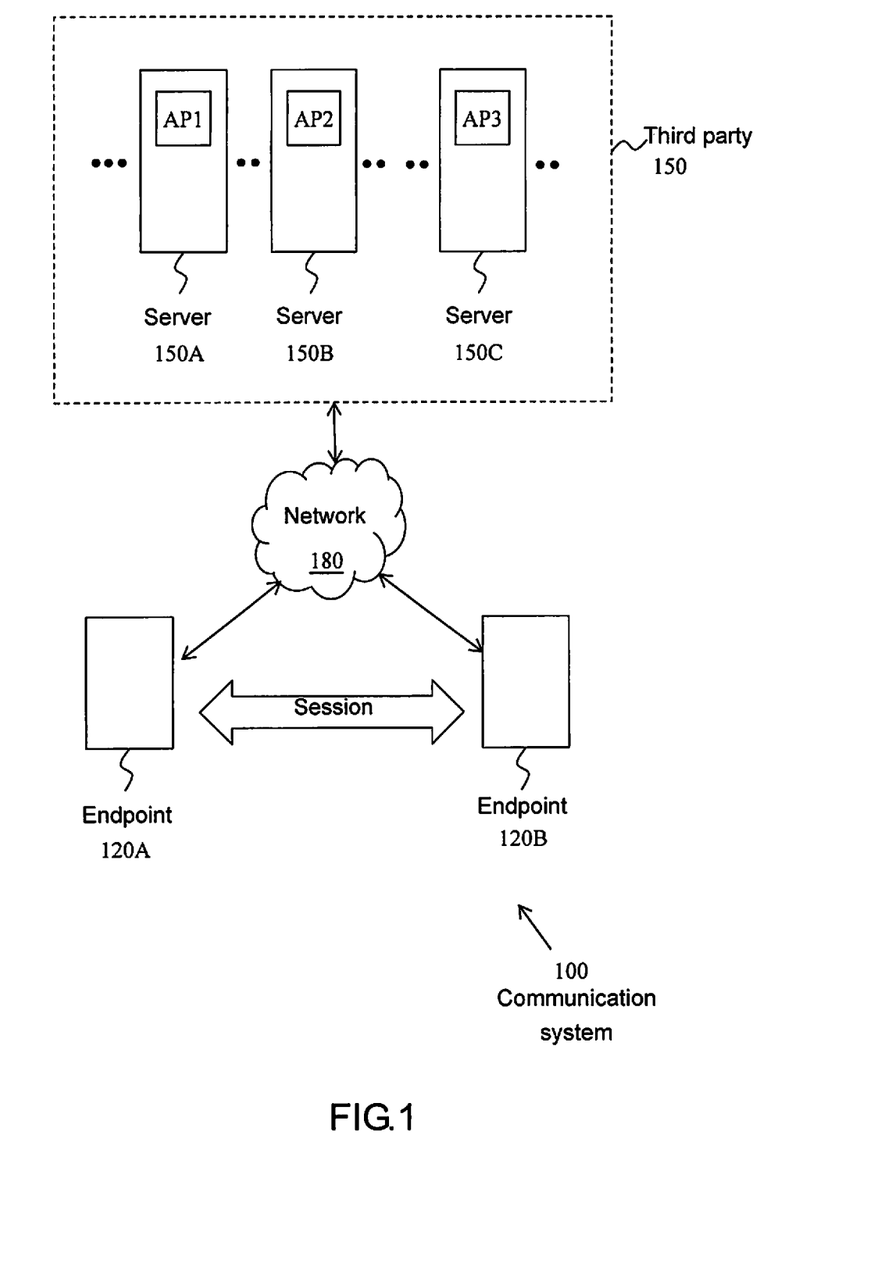
FIG. 1 is a block diagram of a communication system according to an embodiment of the present invention.

Referring to FIG. 1, in an embodiment of the present invention, a communication system 100 comprises two endpoints 120A, 120B, such as personal computers, notebook computers, or mobile electronic devices. Understandably, the communication system 100 can comprise more than two endpoints (not shown) or other network components (not shown). The endpoints 120A, 120B are connected by a network 180. The network 180 is a network of any type, such as the Internet, a local area network (LAN), a wide area network (WAN), a virtual private network (VPN), a public switched telephone network (PSTN), or a combination thereof. The endpoints 120A, 120B carry out peer-to-peer (P2P) communication through the network 180. For example, the P2P communication may be video and audio conferences held by Skype. In another embodiment, peer-to-peer communication takes place between the endpoints 120A, 120B according to the Session Initiation Protocol (SIP). The above-mentioned is well known among persons skilled in the art and thus is not described in detail herein for the sake of brevity.

In addition to the endpoints 120A, 120B, the communication system 100 further includes a third party 150. In one embodiment, the third party 150 is not necessarily a specific server or network component. Rather, the third party 150 is collectively all the network components (except the endpoints 120A, 120B) included in the communication system 100 and required to implement the process flow of the method depicted in FIGS. 2-4 and described hereunder. The endpoints 120A, 120B are connected to the third party 150 through the network 180. In one embodiment, the third party 150 may be a cloud service for providing one or more applications AP1, AP2, etc. In the embodiment illustrated with FIG. 1, the third party 150 operates by means of and in conjunction with a plurality of servers 150A, 150B, etc. The servers 150A, 150B, etc. communicate with each other through the network 180 or a dedicated network (not shown) and thereby operate jointly. In one embodiment, the servers 150A, 150B, etc. are managed by different commercial organizations, respectively. In another embodiment, the basic framework and components of a plurality of the servers 150A, 150B, etc. is in the form of conventional personal computers or servers, such as IBM's System X, Blade Center or eServer, but the present invention is not limited thereto.

Figure 2:
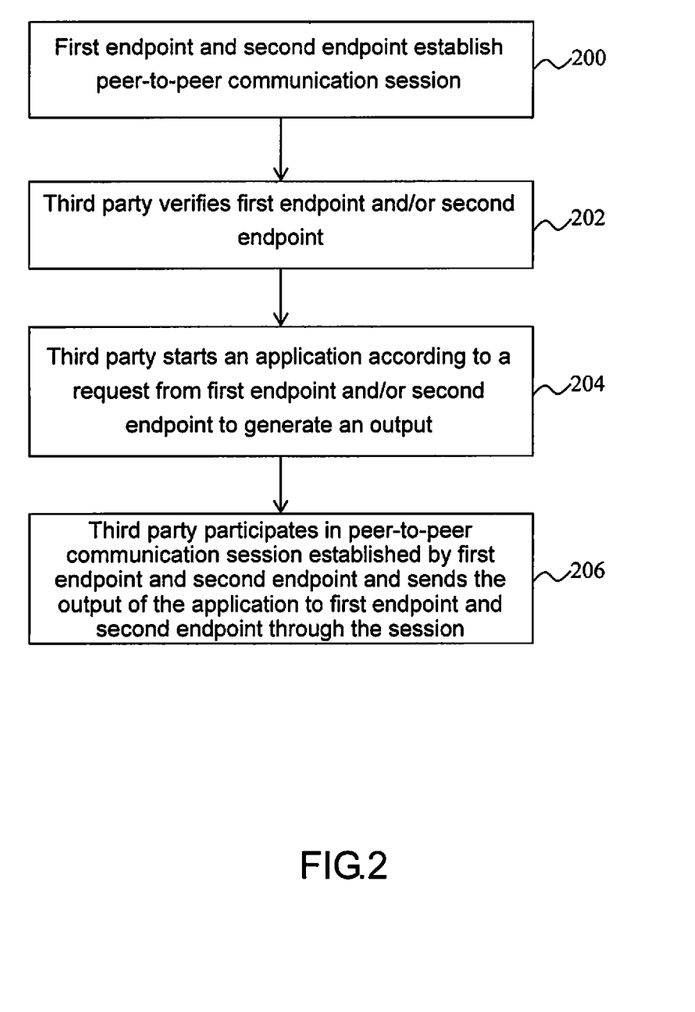
FIG. 2 is a depiction of a method according to an embodiment of the present invention.
Figure 3:
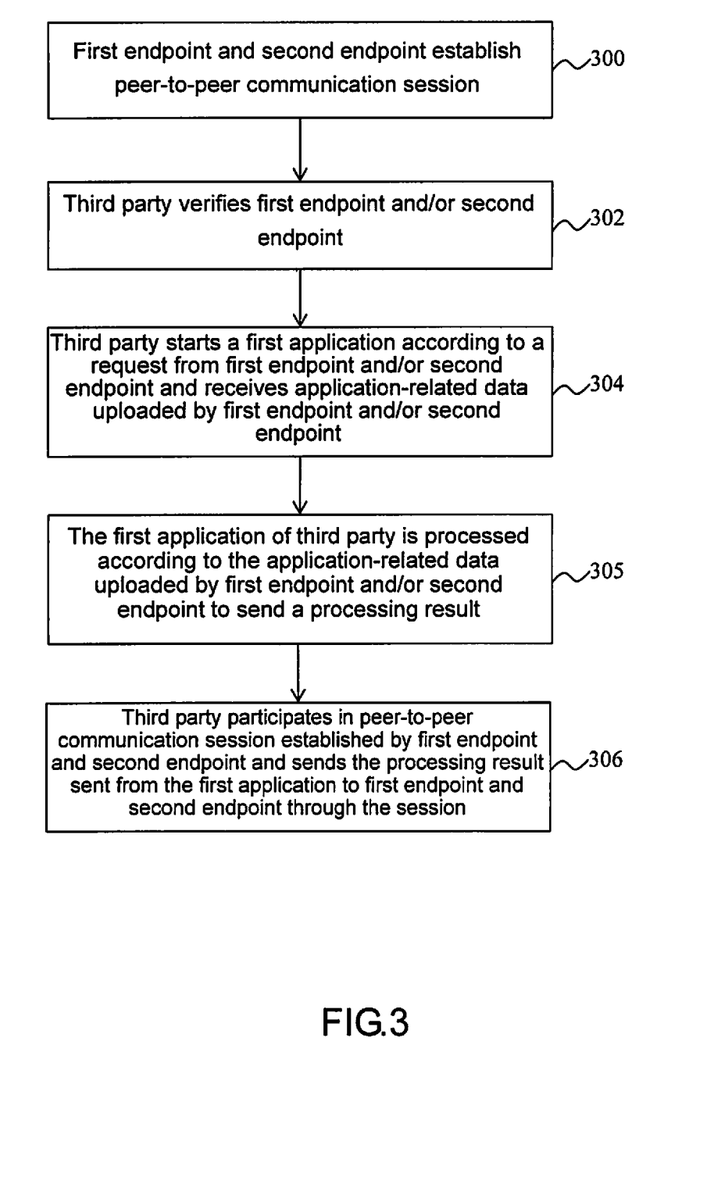
FIG. 3 is a depiction of a method according to another embodiment of the present invention.
Figure 4:
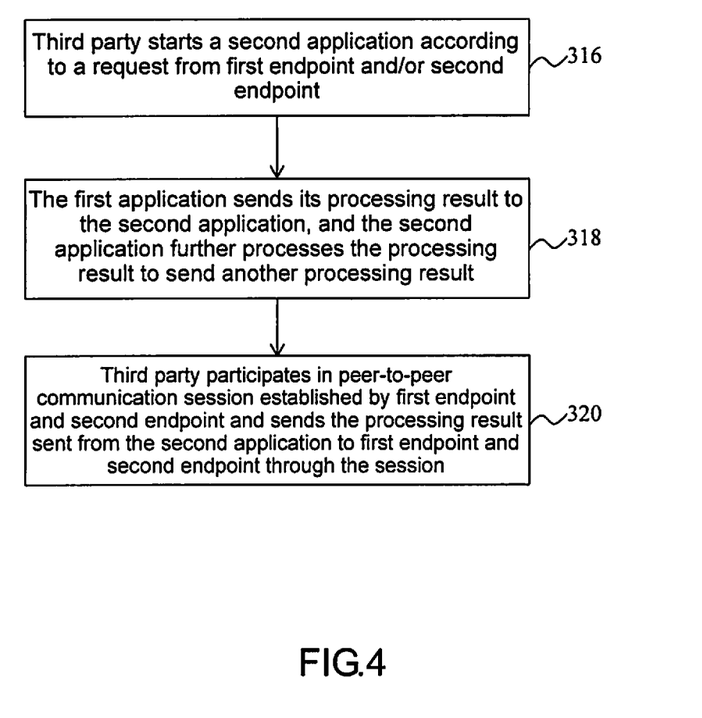
FIG. 4 is a depiction of a method according to another embodiment of the present invention.

The present invention is hereunder illustrated further with the embodiments depicted in FIGS. 2-4, however, persons skilled in the art understand that these embodiments are not restrictive of the present invention.

Referring to FIG. 2, there is shown a flow chart of a computer-implemented method for use with the communication system 100 of FIG. 1 according to an illustrative embodiment of the present invention.

In step 200, the endpoints 120A, 120B carry out peer-to-peer (P2P) communication. The "peer-to-peer communication" is characterized in that, once a communication session between the endpoints 120A, 120B is established, communication between the endpoints 120A, 120B through the session will not require a specific centralized server. For more related information, refer to Skype or P2P-SIP communication as discussed above. Although the above-mentioned is exemplified by the communication between the endpoints 120A, 120B, the peer-to-peer communication in step 200 may also involve other endpoints (not shown). In step 200, the third party 150 has not yet established any connection to the endpoints 120A, 120B.

In step 202, the endpoint 120A is connected to the third party 150 according to a predetermined communication protocol (such as HTTPS) or a dedicated communication protocol, and the third party 150 verifies the endpoint 120A. In one embodiment, the communication protocol encrypts the data to be transferred, such that the endpoint 120A can upload a user profile to the third party 150. Afterward, the third party 150 performs verification according to the received user profile from the endpoint 120A and then takes an action according to the contents of the user profile from the endpoint 120A.

In another embodiment, in step 202, the endpoint 120A instructs, for example, at the peer-to-peer communication session, the endpoint 120B to get connected to the third party 150. Hence, the third party 150 also verifies the user profile of the endpoint 120B and takes an action according to the contents of the user profile of the endpoint 120B. That is to say, in various embodiments of the present invention, it is sufficient to verify just one endpoint (such as the endpoint 120A) during the peer-to-peer communication in step 200. Alternatively, in various embodiments of the present invention, two endpoints (such as the endpoint 120A and the endpoint 120B) or more than two endpoints (not shown) are verified.

In step 202, the third party 150 is connected to the endpoint 120A and/or the endpoint 120B but has not yet participated in the session established between the endpoints 120A, 120B.

In step 204, endpoint 120A and/or the endpoint 120B present the applications AP1, AP2, etc. available for selection by users of the endpoint 120A and/or the endpoint 120B. In an embodiment, the third party 150 further determines the available applications according to the user profile of the endpoint 120A and/or the endpoint 120B. Hence, the availability of the applications AP1, AP2, etc. depends on the authority given to different users. After the users of the endpoint 120A and/or the endpoint 120B have selected the application AP1, for example, the third party 150 starts the application AP1 on the server 150A according to a request sent from the endpoint 120A and/or the endpoint 120B, executes the application AP1, and generates an output. The output from the application AP1 of the server 150A comes in the form of a predetermined message, such as a text, an image, an audio, a video, or a multimedia file, but the present invention is not limited thereto.

In step 206, the third party 150 automatically participates in the peer-to-peer communication session between the endpoints 120A, 120B by the server 150A and sends an output (such as a predetermined message) of the application AP1 to the endpoints 120A, 120B through the session. The present invention is not restrictive of the way of effectuating the participation of the third party 150 in the peer-to-peer communication session between the endpoints 120A, 120B. Additional related information is found in RFC 4353, section 5.2, Adding Participants, and RFC 4579. In an embodiment, upon the receipt of a message sent from the application AP1 through the session, the endpoints 120A, 120B continue the real-time communication (for example, by holding a video conference) with each other through the session.

The above embodiment illustrated with FIG. 2 may be applicable to an inferred situation, in which the application AP1 of the third party 150 is adapted to sending paid value-added content, for example, to the communication session (such as a video conference) of the endpoints 120A, 120B. Hence, in step 202, the third party 150 must verify the endpoint 120A and/or the endpoint 120B first, so as to determine whether the endpoint 120A and/or the endpoint 120B have/has the authority to receive the value-added content. If the verification succeeds, the value-added content sent from the application AP1 will be displayed on video conference screens of the endpoints 120A, 120B, respectively, and the endpoints 120A, 120B can continue discussing the displayed value-added content (such as a TV program) through the video conference.

Moreover, the value-added content may be stored beforehand in the third party 150 serving for cloud services rather than stored at the endpoints 120A, 120B, thereby facilitating the management and expansion of the value-added content. In particular, if the value-added content involves confidentiality or limitation of a license of copyright and thus is not allowed to be permanently stored at the endpoints 120A, 120B, it may be that the value-added content can be read or observed by the endpoints 120A, 120B only but cannot be permanently stored at the endpoints 120A, 120B locally after the value-added content has been sent from the application AP1 of the third party 150 to the communication session between the endpoints 120A, 120B. Once the session ends, the endpoints 120A, 120B will no longer read or observe the value-added content, thereby meeting the requirement for confidentiality and copyright licenses.

Referring to FIG. 3, there is shown a schematic view of the process flow of a computer-implemented method for use with the communication system 100 of FIG. 1 according to an illustrative embodiment of the present invention.

In step 300, the endpoints 120A, 120B carry out peer-to-peer communication, as they do in step 200 of FIG. 2. In step 302, the third party 150 verifies the endpoint 120A and/or the endpoint 120B, as it does in step 202 of FIG. 2.

In step 304, if the verification in step 302 succeeds, the third party 150 will start an application (such as the application AP2 on the server 150B) according to the selection and request made by the endpoint 120A and/or the endpoint 120B. For more related details, refer to step 204 of FIG. 2. Step 304 of FIG. 3 is distinguished from step 204 of FIG. 2 in that, in step 304, after the application AP2 has started, the endpoint 120A and/or the endpoint 120B further upload application-related data required by the application AP2 to the server 150B. Some options include: only the endpoint 120A uploads application-related data; only the endpoint 120B uploads application-related data; and both the endpoint 120A and the endpoint 120B upload application-related data.

In one embodiment, the endpoint 120A and the endpoint 120B upload application-related data to the server 150B of the third party 150 through the connection established to connect with the third party 150 in order for the verification in step 302 to occur. At this point in time, the server 150B of the third party 150 is connected to the endpoint 120A and/or the endpoint 120B but has not yet participated in the session established between the endpoints 120A, 120B in step 300, and in consequence the contents of the application-related data uploaded by the endpoint 120A are unavailable to the endpoint 120B and vice versa. The may be advantageous, provided that the application-related data is confidential.

In step 305, after obtaining the application-related data uploaded by the endpoint 120A and/or the endpoint 120B, the application AP2 processes the application-related data and outputs a processing result. In an embodiment, the application-related data provided by the endpoint 120A relates to a program code pertaining to a data analysis function (or tool), whereas the application-related data provided by the endpoint 120B relates to sample data. Hence, the application AP2 analyzes the sample data from the endpoint 120B by means of the data analysis function from the endpoint 120A to thereby generate and send a processing result.

In step 306, the third party 150 automatically participates in the peer-to-peer communication session between the endpoints 120A, 120B through the server 150B and sends the output of the application AP2 to the endpoints 120A, 120B through the session. For more related details, refer to step 206 of FIG. 2.

The above embodiment illustrated with FIG. 3 may be applicable to an inferred situation, in which the endpoint 120A is a financial consultant or health consultant, whereas the endpoint 120B is a client, such that both parties carry out long-distance consultation by holding a video conference through the peer-to-peer communication established in step 300. In the course of consultation, it is only when the consultant analyzes specific sample data pertaining to the client that the consultant can give appropriate advice according to the analysis result. However, due to the confidential requirements and the legal requirements of different countries, the client's sample data (such as tax return filing records or medical records) cannot be directly provided to the consultant; hence, the third party 150 can function as a trusted agent platform whereby the data analysis function is fetched from the endpoint 120A (the consultant) and the sample data is fetched from the endpoint 120B (the client) and then calculated and analyzed by the application AP2. Since the third party 150 can participate in a session of the video conference, the analysis result of the application AP2 is displayed on the video conference screens of the endpoints 120A, 120B simultaneously by video streaming. Hence, this embodiment meets the requirement that the consultant needs an analysis result in the course of long-distance consultation, and, more importantly, given the above technique, in this embodiment, the endpoint 120A (the consultant) can only see the analysis result but cannot directly see the original sample data, thereby meeting the confidential and legal requirements.

FIG. 4 further illustrates another variant technique for use after step 305 in the embodiment of FIG. 3. In step 316, the third party 150 starts another application (such as the application AP3 on the server 150C) according to the selection and request made by the endpoint 120A and/or the endpoint 120B. In an embodiment, the server 150B in the third party 150 executes the application AP2, whereas the server 150C in the third party executes the application AP3. Hence, the application AP2 and the application AP3 are executed through different hardware devices, respectively, and located at different geographic positions, respectively, to communicate with each other through the network 180 or a dedicated network (not shown). Although the present invention has hitherto disclosed that the application AP2 (the server 150B) and the application AP3 (the server 150C) belong to the third party 150, the term "third party" is thus named to be distinguished nominally from the endpoints 120A, 120B; hence, in one embodiment, the application AP2 (the server 150B) and the application AP3 (the server 150C) can be provided by different commercial organizations, respectively, rather than by the same commercial organization.

In step 318, a processing result, which results from the processing of the application-related data provided to the endpoint 120A and/or the endpoint 120B (see step 305 of FIG. 3), is sent from the application AP2 (the server 150B) to the application AP3 (the server 150C). Hence, the application AP3 further processes a processing result to generate another processing result.

In an embodiment, the application AP2 (the server 150B) sends the processing result to the application AP3 (the server 150C) by video streaming. In addition to a video frame, the application AP2 selectively provides related metadata to the application AP3 and connection-related data (such as IP addresses of the endpoints 120A, 120B) conducive to communication between the application AP3 and the endpoints 120A, 120B. The application AP3 also outputs its processing result by video streaming according to the data provided by the application AP2.

In step 320, the third party 150 automatically participates in the peer-to-peer communication session between the endpoints 120A, 120B through the server 150C and sends the output of the application AP3 to the endpoints 120A, 120B through the session. For more related details, refer to step 206 of FIG. 2.

The embodiment illustrated with FIG. 4 may be applicable to an inferred scenario of long-distance consultation. In the course of the consultation, the consultant and the client watch, on the video conference screen, and discuss the result of the analysis performed by the application AP2 on the client's medical record, as depicted in FIG. 3. If the consultant and the client are dissatisfied with the analysis result presented by the application AP2, the application AP2 will be requested to send the analysis result to the application AP3 for further analysis (for example, comparing the analysis result and medical records of family members of the client), and then the output of the application AP3 will be displayed on the video conference screen by video streaming. In doing so, the consultant can only see the medical record comparison result provided by the application AP3 but cannot directly see the medical records of family members of the client, thereby meeting confidential and legal requirements. Moreover, the above embodiment is advantageous in that resources available to a consultant and a client during a peer-to-peer video conference are technically expandable to an unlimited extent but not subject to the limit of an endpoint device.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims, and is not limited to the above description. All equivalent meanings and scope which fall within the appended claims must be deemed as falling within the scope of the appended claims.

What is claimed is:

1. A computer-implemented method of participating in a peer-to-peer communication session between a first endpoint and a second endpoint, the method comprising:
   receiving a first user data from the first endpoint;
   verifying the first user data by a third party in response to the peer-to-peer communication session being established;
   allowing the third party to automatically participate in the peer-to-peer communication session in response to the verifying;
   receiving a first applicable data from the first endpoint;
   processing the first applicable data by a first application to generate a first processing result;
   sending the first processing result from the first application to a second application;
   processing the first processing result by the second application to generate a second processing result; and
   sending the second processing result to the first endpoint and the second endpoint through the peer-to-peer communication session by the second application.

2. The method of claim 1, further comprising receiving a second user data from the second endpoint and verifying the second user data by the third party.

3. The method of claim 1, further comprising:
   executing the first application by the third party in response to a request sent from the first endpoint to generate an output; and
   sending the output to the first endpoint and the second endpoint through the peer-to-peer communication session.

4. The method of claim 1, further comprising:
   receiving a second applicable data from the second endpoint;
   processing the first applicable data and the second applicable data to generate a third processing result; and
   sending the third processing result to the first endpoint and the second endpoint through the peer-to-peer communication session by the first application.

5. The method of claim 4, wherein one of the first applicable data comprises a program code pertaining to a data analysis function to allow the first application to analyze the second applicable data by the data analysis function and generate the third processing result.

6. The method of claim 1, wherein the peer-to-peer communication session is a video conference session, wherein the first application sends the first processing result to the second application by video streaming, and wherein the second application sends the second processing result to the first endpoint and the second endpoint by video streaming and through the video conference session.

7. The method of claim 1, wherein the first application and the second application are installed on different hardware devices and are connected through a network.

8. A computer system, comprising:
   one or more processors;
   a memory coupled to at least one of the processors;
   a network adaptor that connects the computer system to a computer network;
   a set of instructions stored in the memory and executed by at least one of the processors to enable the computer system to participate in a peer-to-peer communication session between a first endpoint and a second endpoint, wherein the set of instructions perform actions of:
      receiving a first user data from the first endpoint;
      verifying the first user data;
      automatically participating in the peer-to-peer communication session in response to the verifying;
      receiving a first applicable data from the first endpoint;
      processing the first applicable data by a first application to generate a first processing result;
      sending the first processing result from the first application to a second application;
      processing the first processing result by the second application to generate a second processing result; and
      sending the second processing result to the first endpoint and the second endpoint through the peer-to-peer communication session by the second application.

9. The computer system of claim 8, wherein the peer-to-peer communication session is a video conference session, and wherein the second application further sends the processing result to the first endpoint and the second endpoint by video streaming and through the video conference session.

10. The computer system of claim 8, wherein the actions further comprise:
   receiving a second applicable data from the second endpoint;

processing the first applicable data and the second applicable data to generate a third processing result; and sending the third processing result to the first endpoint and the second endpoint through the peer-to-peer communication session by the first application.

11. A computer program product stored in a non-transitory computer readable storage medium, comprising computer instructions that, when executed by a computer system, causes the computer system to participate in a peer-to-peer communication session between a first endpoint and a second endpoint by performing actions comprising:

receiving a first user data from the first endpoint;
verifying the first user data;
automatically participating in the peer-to-peer communication session in response to the verifying;
receiving a first applicable data from the first endpoint;
processing the first applicable data by a first application to generate a first processing result;
sending the first processing result from the first application to a second application;
processing the first processing result by the second application to generate a second processing result; and
sending the second processing result to the first endpoint and the second endpoint through the peer-to-peer communication session by the second application.

12. The computer program product of claim 11, wherein the peer-to-peer communication session is a video conference session, and wherein the second application further sends the processing result to the first endpoint and the second endpoint by video streaming and through the video conference session.

13. The computer program product of claim 11, wherein the actions further comprise:

receiving a second applicable data from the second endpoint;
processing the first applicable data and the second applicable data to generate a third processing result; and
sending the third processing result to the first endpoint and the second endpoint through the peer-to-peer communication session by the first application.

* * * * *